(12) United States Patent
O'Hara et al.

(10) Patent No.: US 9,710,243 B2
(45) Date of Patent: Jul. 18, 2017

(54) PARSER THAT USES A REFLECTION TECHNIQUE TO BUILD A PROGRAM SEMANTIC TREE

(71) Applicants: Steven Arthur O'Hara, San Jose, CA (US); Jeffrey Allen Wilkinson, San Antonio, TX (US)

(72) Inventors: Steven Arthur O'Hara, San Jose, CA (US); Jeffrey Allen Wilkinson, San Antonio, TX (US)

(73) Assignee: Eagle Legacy Modernization, LLC, Cedar Park, TX (US)

( * ) Notice: Subject to any disclaimer, the term of this patent is extended or adjusted under 35 U.S.C. 154(b) by 290 days.

(21) Appl. No.: 14/074,444

(22) Filed: Nov. 7, 2013

(65) Prior Publication Data

US 2015/0128114 A1 May 7, 2015

(51) Int. Cl.
*G06F 9/45* (2006.01)
*G06F 9/44* (2006.01)

(52) U.S. Cl.
CPC ............... *G06F 8/427* (2013.01); *G06F 8/71* (2013.01)

(58) Field of Classification Search
CPC .................................. G06F 8/427; G06F 8/71
USPC .................................................. 717/143, 122
See application file for complete search history.

(56) References Cited

U.S. PATENT DOCUMENTS

| | | | |
|---|---|---|---|
| 5,408,665 A | 4/1995 | Fitzgerald | |
| 5,493,678 A * | 2/1996 | Arcuri | G06F 8/33 |
| 5,812,853 A * | 9/1998 | Carroll | G06F 8/427 |
| | | | 717/108 |
| 5,857,212 A | 1/1999 | Van De Vanter | |
| 7,219,338 B2 | 5/2007 | Venter | |
| 7,302,383 B2 * | 11/2007 | Valles | G06F 17/2785 |
| | | | 704/231 |
| 7,526,755 B2 | 4/2009 | DeLine et al. | |
| 7,774,746 B2 * | 8/2010 | Mansfield | G06F 17/227 |
| | | | 704/2 |
| 8,015,554 B2 * | 9/2011 | Varma | G06F 8/51 |
| | | | 717/137 |

(Continued)

FOREIGN PATENT DOCUMENTS

JP 10154079 A 9/1997

OTHER PUBLICATIONS

Case study: Re-engineering C++ component models via automatic program transformation—Robert L. Akers,Ira D. Baxter,Michael Mehlich—Semantic Designs Inc., USA; Brian J. Ellis, Kenn R. Luecke—The Boeing Company, USA—R.L. Akers et al. / Information and Software Technology 49 (2007) 275-291.*

(Continued)

*Primary Examiner* — Francisco Aponte
(74) *Attorney, Agent, or Firm* — Douglas L. Weller (57) ABSTRACT

A grammar of a first programming language is represented in member fields and data types of object-oriented classes of a second programming language as an empty program semantic tree. A parser builds a new program semantic tree that represents source code written in the first programming language. The new program semantic tree is built by a reflection technique in which the member fields and data types of the object-oriented classes of the second programming language as set out in the empty program semantic tree are modified during the building of the new program semantic tree.

12 Claims, 9 Drawing Sheets

(56) References Cited

U.S. PATENT DOCUMENTS

| | | | |
|---|---|---|---|
| 8,027,946 B1* | 9/2011 | Daily | G06F 11/2257 706/47 |
| 8,060,857 B2* | 11/2011 | Biggerstaff | G06F 8/456 717/106 |
| 8,132,156 B2* | 3/2012 | Malcolm | G06F 11/3688 717/122 |
| 8,166,462 B2* | 4/2012 | Kosche | G06F 11/328 717/125 |
| 8,176,475 B2* | 5/2012 | Kosche | G06F 11/3447 717/127 |
| 8,181,167 B2 | 5/2012 | Zhao | |
| 8,219,512 B2* | 7/2012 | Daily | G06F 11/2257 706/45 |
| 8,302,085 B2* | 10/2012 | Schellekens | G06F 11/3447 717/131 |
| 8,453,126 B1 | 5/2013 | Ganelin | |
| 8,479,178 B2* | 7/2013 | Aharoni | G06F 9/45516 717/148 |
| 8,739,150 B2* | 5/2014 | Gass | G06F 8/36 717/168 |
| 8,898,627 B2* | 11/2014 | Gass | G06F 8/65 717/106 |
| 8,924,924 B2* | 12/2014 | Brown | G06F 17/2705 717/104 |
| 9,182,962 B2* | 11/2015 | Kneisel | G06F 8/51 |
| 9,519,465 B2* | 12/2016 | Bernecker | G06F 8/51 |
| 2003/0084424 A1* | 5/2003 | Reddy | G06F 8/71 717/105 |
| 2003/0101195 A1 | 5/2003 | Linhart | |
| 2003/0196195 A1* | 10/2003 | Sluiman | G06F 8/427 717/143 |
| 2004/0194072 A1 | 9/2004 | Venter | |
| 2004/0225999 A1* | 11/2004 | Nuss | G06F 8/31 717/114 |
| 2005/0005266 A1* | 1/2005 | Datig | G06F 17/279 717/136 |
| 2005/0015753 A1* | 1/2005 | Meijer | G06F 9/443 717/136 |
| 2005/0050525 A1* | 3/2005 | Chittar | G06F 8/51 717/136 |
| 2005/0246685 A1* | 11/2005 | Braddock | 717/116 |
| 2006/0005174 A1* | 1/2006 | Feigenbaum | G06F 9/4443 717/143 |
| 2006/0009962 A1* | 1/2006 | Monk | G06F 17/2264 704/4 |
| 2006/0031820 A1* | 2/2006 | Li | 717/137 |
| 2006/0047691 A1 | 3/2006 | Humphreys et al. | |
| 2006/0117307 A1* | 6/2006 | Averbuch | G06F 17/2247 717/143 |
| 2006/0143597 A1* | 6/2006 | Alaluf | G06F 8/52 717/136 |
| 2006/0206860 A1* | 9/2006 | Dardinski | G05B 15/02 717/105 |
| 2007/0011669 A1* | 1/2007 | Varma | G06F 8/51 717/168 |
| 2007/0022414 A1* | 1/2007 | Bird | G06F 9/45508 717/143 |
| 2007/0044066 A1* | 2/2007 | Meijer | G06F 8/33 717/100 |
| 2007/0050760 A1* | 3/2007 | Liu | G06F 8/37 717/143 |
| 2007/0113221 A1* | 5/2007 | Liu | G06F 8/10 717/143 |
| 2007/0219933 A1* | 9/2007 | Datig | G06F 17/279 706/4 |
| 2007/0226708 A1* | 9/2007 | Varma | G06F 8/51 717/139 |
| 2007/0300212 A1* | 12/2007 | Kersters | G06F 8/36 717/150 |
| 2008/0091409 A1* | 4/2008 | Anderson | G06F 8/427 704/9 |
| 2008/0189683 A1* | 8/2008 | Payette | G06F 8/41 717/114 |
| 2008/0201355 A1 | 8/2008 | Bloesch et al. | |
| 2009/0222799 A1* | 9/2009 | Stewart | G06F 8/72 717/143 |
| 2010/0162204 A1* | 6/2010 | Baumann | G06F 8/24 717/106 |
| 2011/0138373 A1* | 6/2011 | Lane | G06F 8/443 717/157 |
| 2011/0161940 A1 | 6/2011 | Brunswig et al. | |
| 2011/0167088 A1* | 7/2011 | Warren | G06F 8/427 707/781 |
| 2011/0283269 A1* | 11/2011 | Gass | G06F 8/65 717/168 |
| 2011/0283270 A1* | 11/2011 | Gass | G06F 8/71 717/168 |
| 2011/0296391 A1* | 12/2011 | Gass | G06F 8/72 717/168 |
| 2012/0144376 A1* | 6/2012 | Van Eijndhoven | G06F 8/456 717/146 |
| 2012/0191446 A1* | 7/2012 | Binsztok | G06F 8/30 704/9 |
| 2012/0323863 A1* | 12/2012 | Dove | G06F 17/30731 707/692 |
| 2013/0124545 A1 | 5/2013 | Holmberg et al. | |
| 2013/0159976 A1* | 6/2013 | Jazdzewski | G06F 8/443 717/126 |
| 2013/0174131 A1* | 7/2013 | Takeuchi | G06F 8/51 717/137 |
| 2013/0326204 A1* | 12/2013 | Grimm | G06F 8/423 712/234 |
| 2014/0149970 A1* | 5/2014 | Duchenay | G06F 8/37 717/143 |

OTHER PUBLICATIONS

Analysis and Code Model Extraction for C/C++ Source Code—Christian Wagner, Tiziana Margariay and Hans-Georg Pagendarm—German-Dutch Wind Tunnels, Gottingen, Germany and Chair of Service and Software Engineering, University of Potsdam, Germany—2009 14th IEEE International Conference on Engineering of Complex Computer Systems.*

Program Transformation with Stratego/XT Rules, Strategies, Tools, and Systems in Stratego/XT 0.9-Eelco Visser Institute of Information and Computing Sciences, Utrecht University, Utrecht, The Netherlands—C. Lengauer et al. (Eds.): Domain-Specific Program Generation, LNCS 3016, pp. 216-238, 2004.*

A Three-Phase Approach to Efficiently Transform C# into KDM Christian Wulf, Soren Frey, and Wilhelm Hasselbring—Software Engineering Group, University of Kiel, Germany—Aug. 24, 2012.*

* cited by examiner

PARSER THAT USES A REFLECTION TECHNIQUE TO BUILD A PROGRAM SEMANTIC TREE

BACKGROUND

American and European businesses have billions of lines of production software that are written in legacy computer languages like COBOL, RPG, PL/I, Fortran and Natural. These businesses are highly motivated to modernize their software, but the process is often either extremely expensive or extremely low quality. The available tools are often not optimized for complex software systems that can have tens of millions of lines of code. The first step in an application modernization project is parsing and analyzing all the existing software.

When parsing, a parser analyzes a string of symbols within source code in accordance with the rules of a language within a grammar. On the basis of the analysis, the parser produces, for example, abstract syntax trees (AST). Based on the information within the abstract syntax trees, a semantic analyzer creates a database that includes data flow (typically in the form of symbol tables) and control flow information (indicating, for example, who calls whom). An analysis tool can be used to traverse the abstract syntax trees looking for specific named entities. The analysis tools depend on the names of entities as listed in the grammar. If someone changes any name listed in the grammar, it can cause a problem for the analysis tool searching in the grammar for that old name for that entity.

Unfortunately, grammars often are changed to take into account variations in hardware, operating systems and business-specific conventions. To avoid problems, the analysis tools need to keep apprised of these changes. If changes in the grammar are not properly communicated and taken into account in operation of the analysis tools, this can raise serious difficulties for correct analysis of the original source programs. There is ample opportunity for analysis tools to get out of sync with a grammar when many changes are made to the grammar by many different people. For this reason, in general, having only a few people maintain a grammar, a parser and associated analysis tools can help to decrease the possibility of a loss of synchronization between the grammar and the analysis tools. However, when only a few people maintain a grammar, a parser and associated analysis tools, this makes it difficult to scale up to millions of lines of source code.

DETAILED DESCRIPTION

Computer programming languages can be parsed without a traditional grammar, by exploiting a programming technique called reflection. In the reflection programming technique, a computer program examines and modifies the structure and behavior of an object at runtime.

Using reflection, a parser can build program semantic trees (PSTs) where the semantics of legacy programming language can be captured, in addition to just the syntax as in traditional abstract syntax trees (ASTs).

In order to accomplish this, the member fields and data types of object-oriented classes are used to represent the grammar of a programming language, such as COBOL or Fortran or even a modern language like C#. The object-oriented classes are, for example, represented in a modern programming language like Java.

For example, the PERFORM verb in COBOL can be expressed as a Java class, and the elements within the PERFORM statement will contain references to the paragraphs and variables used.

Once the grammar of a programming language is represented in the member fields and data types of object-oriented classes, the reflection programming technique is used to make the object-oriented classes work as a grammar used for parsing.

For example, additional semantic information (such as symbol tables and control flow information) can be represented in the same object-oriented classes.

To illustrate how representing the grammar of a programming language in the member fields and data types of object-oriented classes is different than how grammar is represented in a traditional grammar, consider the following example.

In table 1 below is set out an example of COBOL programming code.

TABLE 1

| | |
|---|---|
| 000160 | READ-SHARED-LOCK. |
| 000170 | READ SHARED WITH LOCK. |
| 000180 | IF WS-STATUS = "00" |
| 000190 | GO TO READ-SHARED-EXIT. |
| 000200 | IF WS-STAT1 = "2" OR "3" OR "4" |
| 000210 | MOVE 33 TO WS-F-ERROR |
| 000220 | PERFORM READ-ERROR. |
| 000230 | IF RECORD-LOCKED |
| | COMMIT |
| | PERFORM LOCK-USERS-REC THRU LOCK-REC-EXIT |
| | WS-COUNT TIMES |
| | ADD 1 TO WS-COUNT |
| | IF WS-COUNT > 25 |
| | MOVE 1 TO WS-COUNT |
| | END-IF |
| 000250 | GO TO READ-SHARED-LOCK |
| | ELSE |
| | MOVE W02-SHARED |
| | TO WS-FILE |
| | MOVE WS-SHARED |
| | TO WS-KEY |
| 000240 | PERFORM LOCKED-RECORD WS-COUNT TIMES |
| | ADD 1 TO WS-COUNT |
| | IF WS-COUNT > 20 |
| | MOVE 1 TO WS-COUNT |
| | END-IF |
| 000250 | GO TO READ-SHARED-LOCK. |
| 000290 | MOVE 2 TO WS-F-ERROR. |

TABLE 1-continued

| 000300 | PERFORM READ-ERROR. |
| 000320 | READ-SHARED-EXIT. |
| 000330 | EXIT. |

Note the "PERFORM" statements in lines 000220 and 000240 of the COBOL code set out in table 1. In a traditional grammar, a (greatly simplified) PERFORM verb in COBOL might be expressed as set out in table 2 below:

TABLE 2

| cPerform | := "PERFORM" cParagraph [("THROUGH" \| "THRU") cParagraph] [cPerfTimes]; |
| cPerfTimes | := cExpression "TIMES"; |
| cParagraph | := cIdentifier; |
| cExpression | := cIdentifier \| cNumber; |
| cIdentifier | := cLetter (cLetter \| cDigit \| "-")*; |
| cNumber | := cDigit cDigit*; |
| cLetter | := "A".. "Z"; |
| cDigit | : "0".."9" |

In the expression set out in table 2, a vertical bar "|" represents a logical "OR" and an asterisk "*" indicates zero or more occurrences.

The PERFORM verb in the member fields and data types of object-oriented classes of an object oriented language, such as Java, might be expressed (again greatly simplified) as set out in table 3 below:

TABLE 3

```
class COBOL_Perform extends COBOL_AbstractStatement {
    COBOL_Keyword PERFORM;
    COBOL_Paragraph startPara;
    @OPT COBOL_PerformThrough through;
    @OPT COBOL_PerformTimes times;
    class COBOL_PerformThrough extends TokenSequence {
        COBOL_KeywordList THRU = new
            COBOL_KeywordList("THRU", "THROUGH");
        COBOL_Paragraph endPara;
    }
    class COBOL_PerformTimes extends TokenSequence {
        COBOL_Expression number;
        COBOL_Keyword TIMES;
    }
}
```

In table 3 and elsewhere herein, @OPT indicates an optional token or element. The representation of the PERFORM verb shown in Table 3 serves two distinct purposes. First, it can be considered a template for defining the language (such as the PERFORM verb in COBOL), describing all the different ways the language can be used. Second, it can be populated with values as a result of the parsing process. That is, as discussed above, the output representation from the parsing process is a program semantic tree (PST) representation instead of an application syntax tree (AST).

Figure 1:
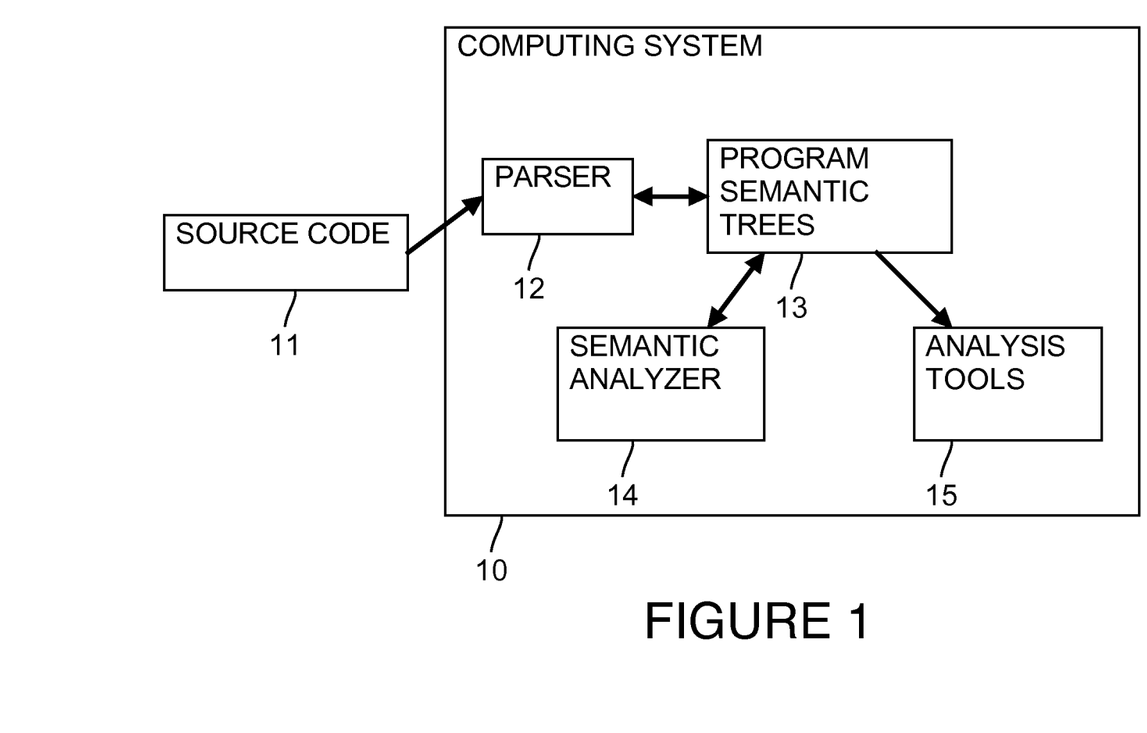
FIG. 1 shows a parser analyzing source code to produce program semantic trees in accordance with an embodiment.

FIG. 1 illustrates the process where a parser 12 within a computing system 10 parses source code 11 to produce program semantic trees 13. Semantic analyzer 14 can be used to perform semantic analysis of program semantic trees 13. Analysis tools 15 can be used to perform further analysis and processing of program semantic trees 13 built by parser 15. For example, analysis tools 15 can be within computing system 10 or another computing system.

Using a PST as the output of a parsing process, rather than an AST has several advantages. A PST is scalable. Dependencies are caught automatically. That is when using member fields and data types of object-oriented classes of an object oriented language, any change in definition will be detected immediately. If someone were to change the name of an element to a new name not within the current member fields and data types of any object oriented class, all references to the new name would be marked as invalid until they were changed accordingly in the current member fields and data types.

Further, in PST output all the information for the source code is directly referenced by objects within the PST. For example, within the PST, COBOL_paragraph (see Table 3) has a direct reference to that paragraph, including all of its statements, line numbers, references, etc. This greatly simplifies tool writing. Much of the work in connecting references to definitions can be done as part of the parse process. By contrast, in the AST version (see Table 2), a cParagraph is just an identifier with a name. There is no further information attached to it. If one writes a tool to analyze or transform a COBOL program, it is necessary to search the rest of the AST to find out what is in that other paragraph.

Additionally, using PSTs allows the use of modern programming language methodologies. Because the PST itself is represented in a modern programming language like Java or C#, the methodologies of that language can be used in the program definition. Annotation, for example, is used for better output formatting, and is also used for external language documentation.

Also, use of PSTs allows for abstraction. When using PSTs, the components common to all variations of a particular programming language can be placed into an abstract language definition. For example, there are many major variations of languages like Report Program Generator (RPG). The File specification has a similar meaning across each of them, so only minor syntactic variations need to be included in each version of RPG. By contrast, a traditional grammar is typically tailored for just one version of one programming language.

Use of object oriented language in PSTs also allows for taking advantage of inheritance. Frequently, there are variations on a computer programming language. With a traditional grammar, the whole grammar gets copied and edited for each variation. In PST, which allows for program inheritance, only the local changes need to be considered and the rest can be inherited from the main program.

Use of object oriented language in PSTs also allows for encapsulation. Some computer languages, such as HTML used for web pages, often include other languages inside of them, such as Javascript or PHP. In a traditional grammar, these are normally combined into a monolithic grammar covering all sub-languages. With program encapsulation, the main program (e.g., HTML) can simply reference the other program (e.g., Javascript or PHP).

Use of object oriented language in PSTs means the full power of the programming language (e.g., Java) is available for representing complicated issues. An example of a complicated issue where logic is helpful to assist the parsing process to build the correct hierarchy is in managing the data division level numbers in COBOL. By contrast, it can be difficult to mix procedural logic with a grammar that is declarative.

During the parsing process, reflection is used to populate member fields and data types of object-oriented classes of an object oriented language based on the source code. There is no separate grammar (other than the member fields and data types of object-oriented classes), and there is no AST. The result is a robust representation of the original source code.

Various modern computer languages can be used to generate program semantic trees. For example, IBM Assembler, Fortran, PL/I, RPG, Java, Visual Basic, Delphi, DOS, SQL, and many more programming languages have been parsed and analyzed using this technique.

Parser 12 performs token sequence parsing on source code 11 after source code 11 is represented as a sequence of tokens in PST 13.

Figure 2:
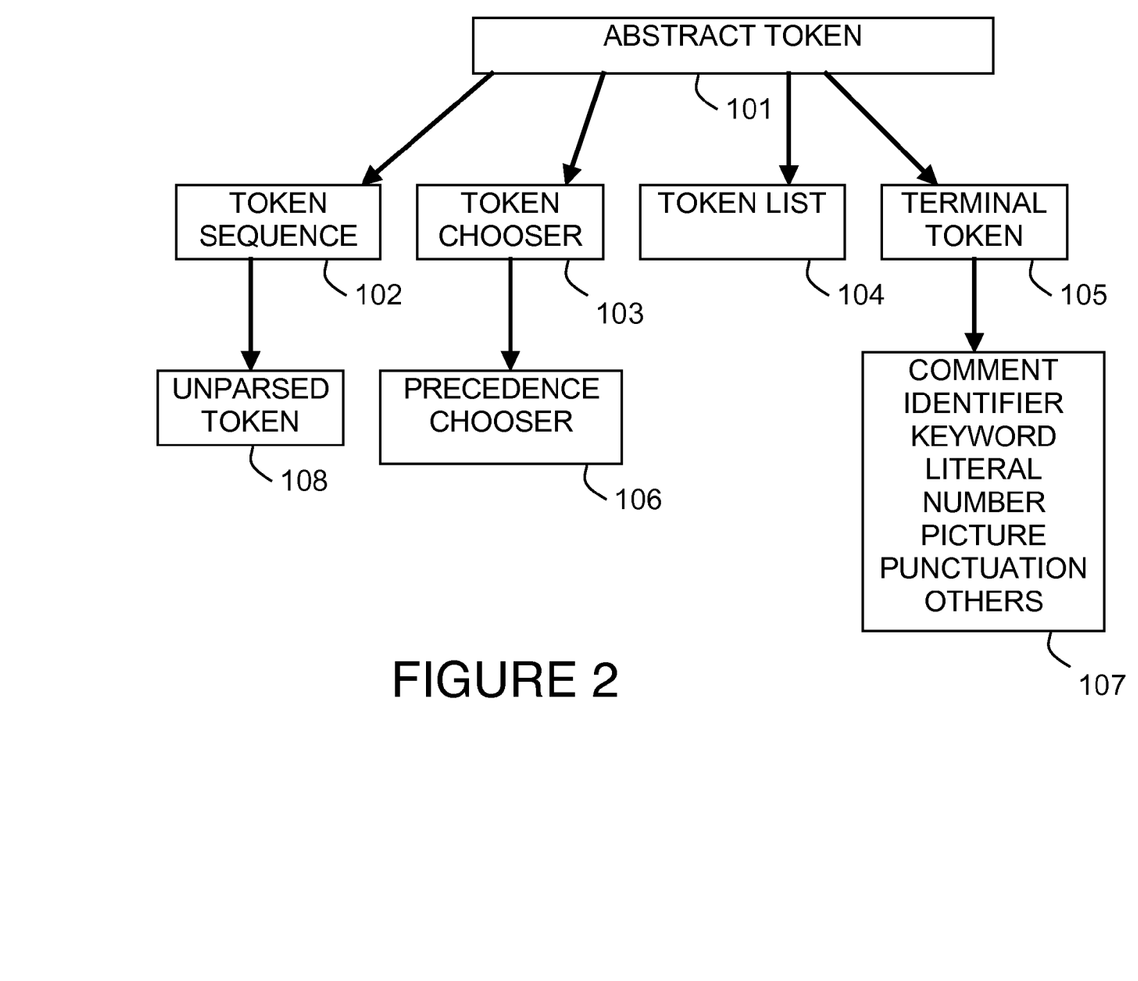
FIG. 2 illustrates token types in accordance with an embodiment.

FIG. 2 illustrates the token types. Conceptually, every element is an abstract token 101. A terminal token 105 can be, as illustrated by block 107, a comment, an identifier, a keyword, a literal, a number, a picture, punctuation, or some other lowest level token that does not contain other abstract tokens.

A token list 104 is one or more of the specified abstract tokens. The number can be zero or more if the token list is marked as optional. For a token chooser 103, exactly one sub-element is present. Precedence chooser 106 handles arithmetic operator precedence rules.

Token sequence 102, consists of a sequence of abstract tokens, each of which may be optional (marked with @OPT). In a token sequence, the elements must appear in the specified order, and all of the elements must be present unless marked optional. An unparsed token 108 variation of token sequence 102 is used to report that a small section of the source code was skipped over.

Figure 3:
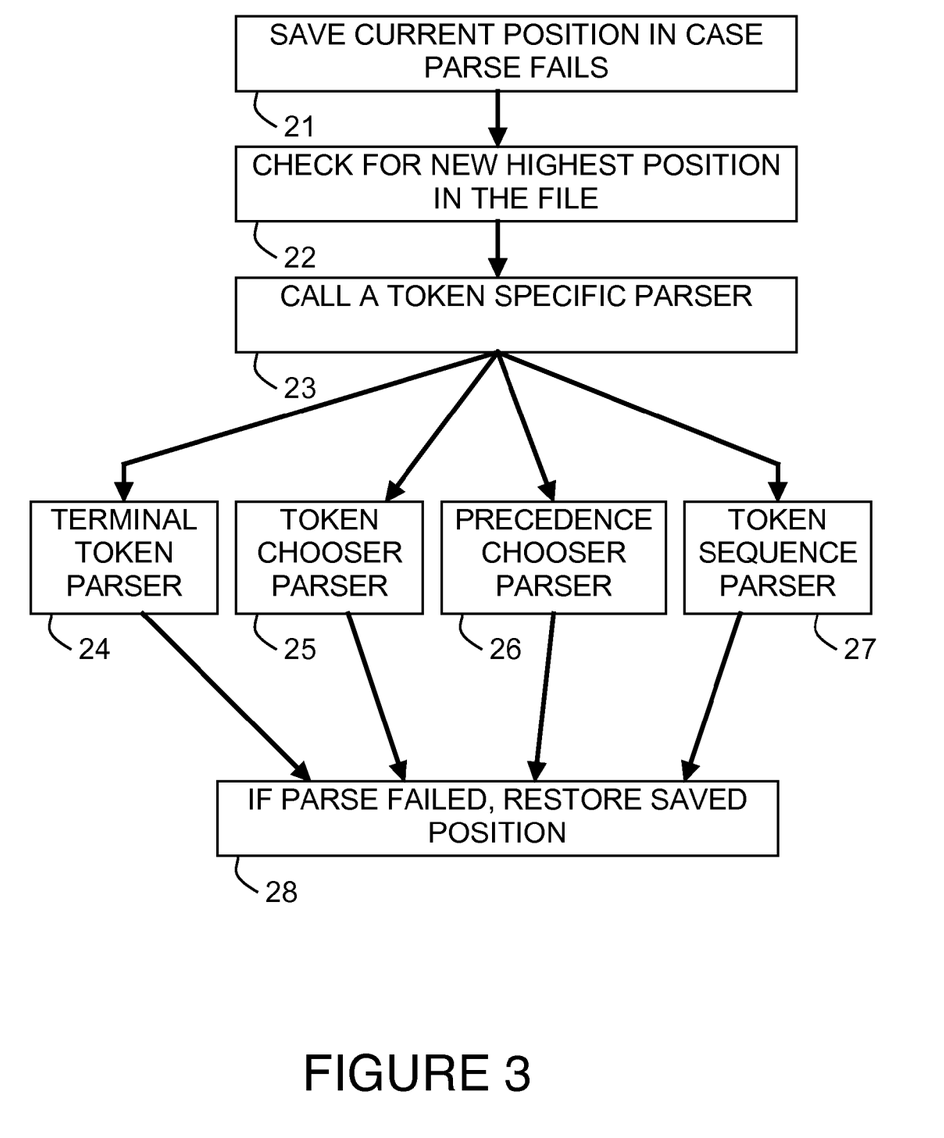
FIG. 3 shows top level parser flow in accordance with an embodiment.

FIG. 3 shows top level parser flow for parser 12. In a block 21, current position is saved in case the parse fails. In a block 22, a check is made for the new highest position in the file holding the source code. In a block 23, a token specific parser is called to parse the token in the highest position in the file. Token specific parsers are one of terminal token parser 24, token chooser parser 25, precedence chooser parser 26 and token sequence parser 27. Token lists are processed inside token sequence parser 27.

In a block 28, if the parse failed, the position saved in block 21 is restored.

Figure 4:
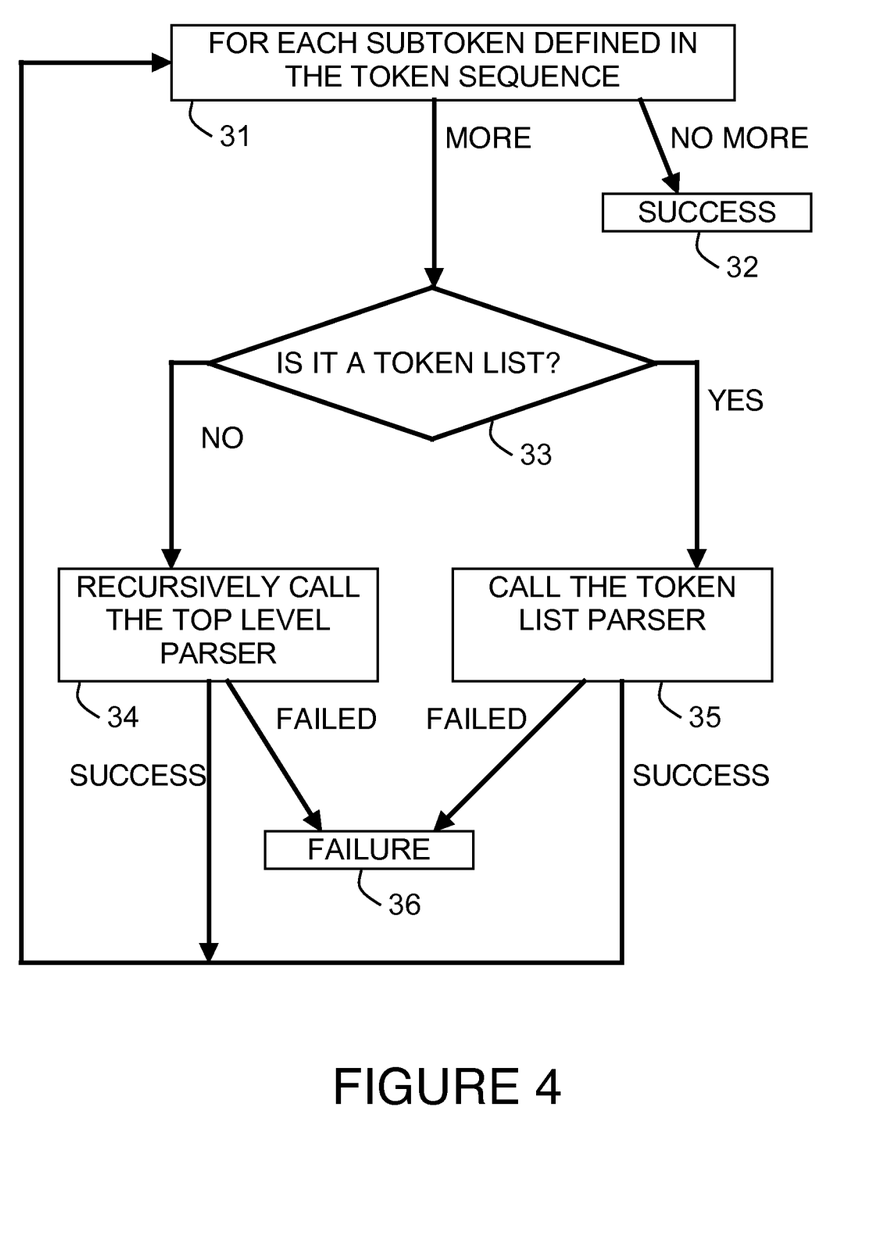
FIG. 4 shows logic flow for a token sequence parser in accordance with an embodiment.

FIG. 4 shows logic flow for token sequence parser 27. Block 31 is repeated for each subtoken defined in the token sequence. Where there are not more subtokens, success is reached in a block 32 and token sequence parser 27 returns.

In a block 33, a check is determined whether the subtoken is a token list. If not, the top level parser, shown in FIG. 3, is recursively called. If the top level parser returns successfully, control is returned to block 31. If the top level parser returns unsuccessfully, in a block 36, a parsing failure is recorded and token sequence parser 27 returns.

If in block 33, the check determines the subtoken is a token list, a block 35 the token list parser is called. If the token list parser returns successfully, control is returned to block 31. If the token list parser returns unsuccessfully, in block 36, a parsing failure is recorded and token sequence parser 27 returns.

As pointed out above, for a token sequence, the elements must appear in the specified order, and all of the elements must be present unless marked optional.

Table 4 below sets out an example from a Javascript program, where there are five required elements and one optional element at the end.

TABLE 4

```
public class Javascript_IfStatement extends TokenSequence {
    public Javascript_Keyword IF = new Javascript_Keyword("if");
    public Javascript_Punctuation leftParen = new
        Javascript_Punctuation('(');
    public Javascript_Expression condition;
```

TABLE 4-continued

```
    public Javascript_Punctuation rightParen = new
        Javascript_Punctuation(')');
    public Javascript_Statement thenStatement;
    public @OPT Javascript_IfElseClause elseClause;
}
```

As discussed above, a terminal token 105 is a lowest level token that does not contain other abstract tokens. In the source code, terminal tokens typically include comments, identifiers keywords, pictures, punctuation, and literals. Each terminal token type has many variations. Literals, for example, may be delineated in source code using single quotes ('), double quotes (") or both. Literals may allow an escape character before quotes (\") or two quotes to mean just one quote. Literals also may be allowed to span line boundaries. Numbers may use different notation to represent hexadecimal numbers, floating point numbers, and so on.

Identifiers and keywords can also be difficult to accurately represent as abstract tokens. In some languages both identifiers and keywords are case sensitive. In other languages, neither identifiers nor keywords are case sensitive. Some languages have reserved keywords that cannot be used as identifiers.

In a traditional grammar, terminal tokens are often difficult to express due to column constraints, end-of-line issues, and so on. However, when the grammar of a programming language is represented in the member fields and data types of object-oriented classes, the full power of a programming language is available for parsing, along with contextual information.

For example, consider the COBOL code set out in table 5:

TABLE 5

| 01 | PTR-ITEMS. | |
|----|------------|---|
| 02 | UNSTR-PTR | PIC 99. |
| 88 | END-OF-ADDRESS | VALUE 61. |
| 88 | END-OF-NAME | VALUE 36. |
| 02 | STR-PTR | PIC 99. |
| 02 | NAME-END | PIC 99. |

Figure 5:
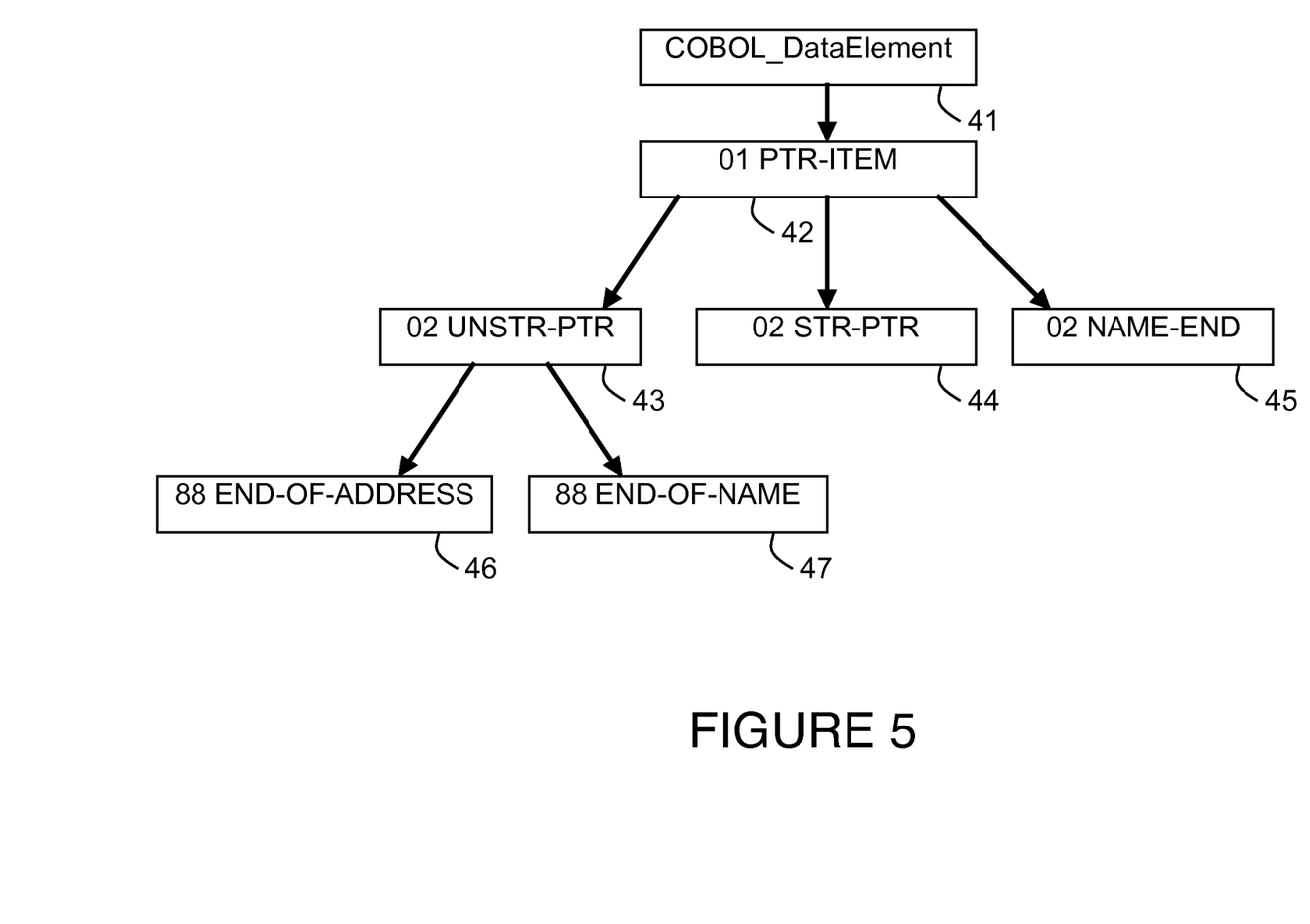
FIG. 5 shows a tree structure generated from terminal tokens in accordance with an embodiment.

When the full power of a programming language is available for parsing the code in Table 5, the structure in the code in Table 5 can be preserved in a program semantic tree, as shown in FIG. 5. That is, in FIG. 5, a block 41, a block 42, a block 43, a block 44, a block 45, a block 46 and a block 47 are arranged to reflect both the content and structure of the code set out in Table 5.

Figure 6:
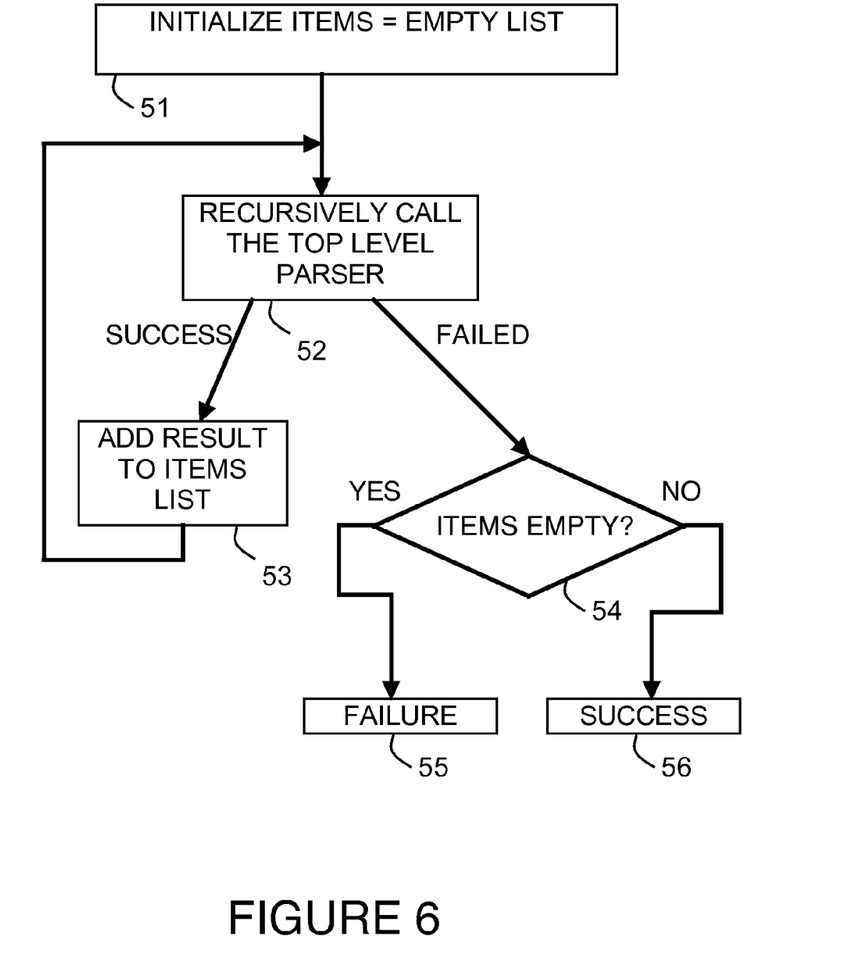
FIG. 6 shows logic flow for a token list parser in accordance with an embodiment.

FIG. 6 shows logic flow for a token list parser. In a block 51, the item list is initialized as being empty. In block 52, the top level parser is called recursively to handle the next item in the token list. If the top level parser is successful, in a block 53, the result from the top level parser is added to the items in the list and control is returned to block 52. If in block 52, the top level parser is not successful, in a block 54, a check is made as to the whether this item list is still empty. If so, in a block 55 a parsing failure is recorded and the token list parser returns. If in block 54, the check shows the item list is not empty, in a block 56 a parsing success is recorded and the token list parser returns.

Token Lists are used for sequences of one or more of any other token. They are often marked as optional, with @OPT, to indicate that there may be zero or more. They are "greedy" in the sense that they will try to match as many elements as possible. Table 6 below provides a sample from the DOS command prompt program. It includes two Token Lists, the first is optional but the second is not.

TABLE 6

```
public class CMD_For_Statement extends TokenSequence {
    public CMD_Keyword FOR = new CMD_Keyword("FOR");
    public @OPT TokenList <CMD_For_Option> opts;
    public CMD_Percent_Variable var;
    public CMD_Keyword IN = new CMD_Keyword("IN");
    public TokenList <CMD_For_Argument> args;
    public CMD_Keyword DO = new CMD_Keyword("DO");
    public CMD_Statement stmt;
}
```

Figure 7:
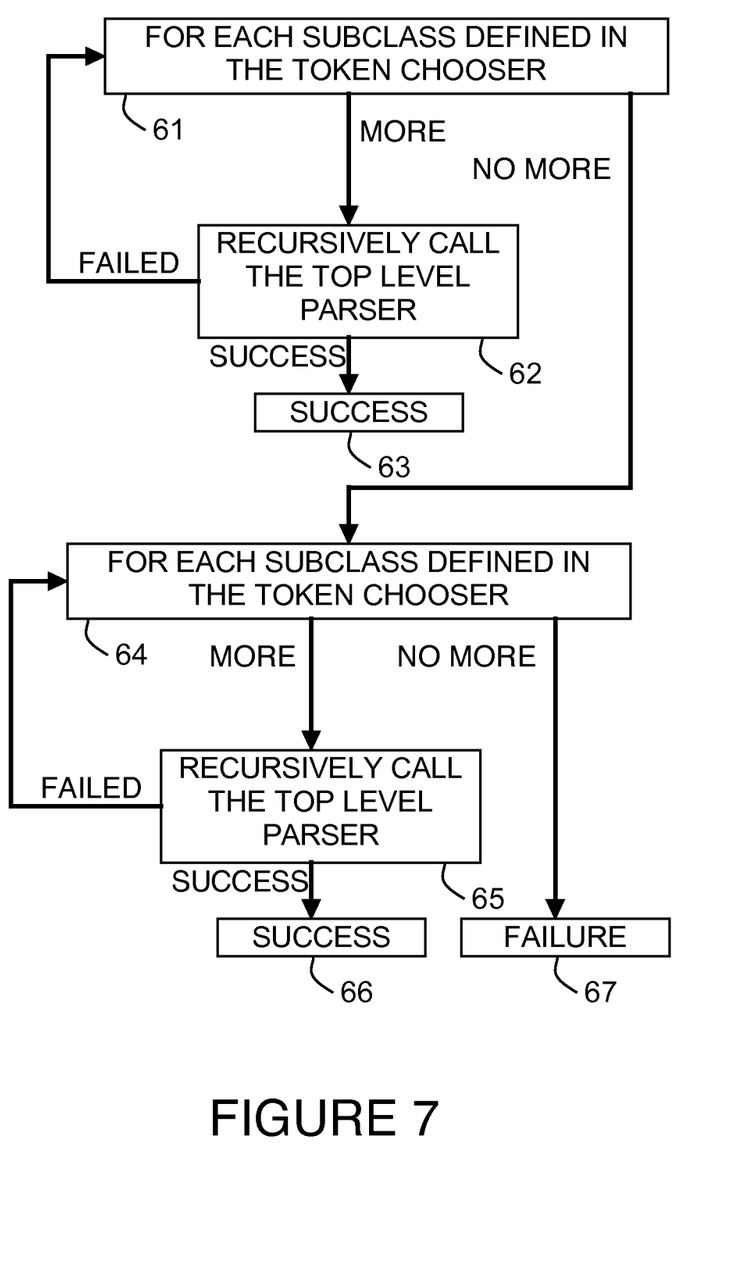
FIG. 7 shows logic flow for a token chooser parser in accordance with an embodiment.

FIG. 7 shows logic flow for token chooser parser 103. In a block 61, each subclass defined in the token chooser is considered in order. Where there are more subclasses, in a block 62, the top level parser is recursively called. If the top level parser returns successfully with a successful parse, in a block 63, token chooser parser 103 returns a success.

If in block 62, the top level parser returns with a failure, control is returned to block 61 and the next subclass is considered. If in block 61, there are no more subclasses to be considered, in a block 64, each subclass defined in the token chooser is considered in order. Where there are more subclasses, in a block 65, the top level parser is recursively called. If the top level parser returns successfully with a successful parse, in a block 66, token chooser parser 103 returns a success.

If in block 65, the top level parser returns with a failure, control is returned to block 64 and the next subclass is considered. If in block 64, there are no more subclasses to be considered, in a block 67 a parse failure is returned.

Table 7 below provides an example from COBOL of tokens handled by token chooser parser 103. There is a list of one or more COBOL_DataSection's and the program allows them in any order.

TABLE 7

```
public class COBOL_DataDivision extends TokenSequence {
    public COBOL_Keyword DATA = new COBOL_Keyword("DATA");
    public COBOL_Keyword DIVISION = new
        COBOL_Keyword("DIVISION");
    public COBOL_Punctuation dot = new COBOL_Punctuation('.');
    public TokenList <COBOL_DataSection> sections;
}
public class COBOL_DataSection extends TokenChooser {
    public COBOL_FileSection fileSection;
    public COBOL_WorkingStorageSection workingStorageSection;
    public COBOL_ScreenSection screenSection;
    public COBOL_LinkageSection linkageSection;
    public COBOL_ReportSection reportSection;
}
```

Figure 8:
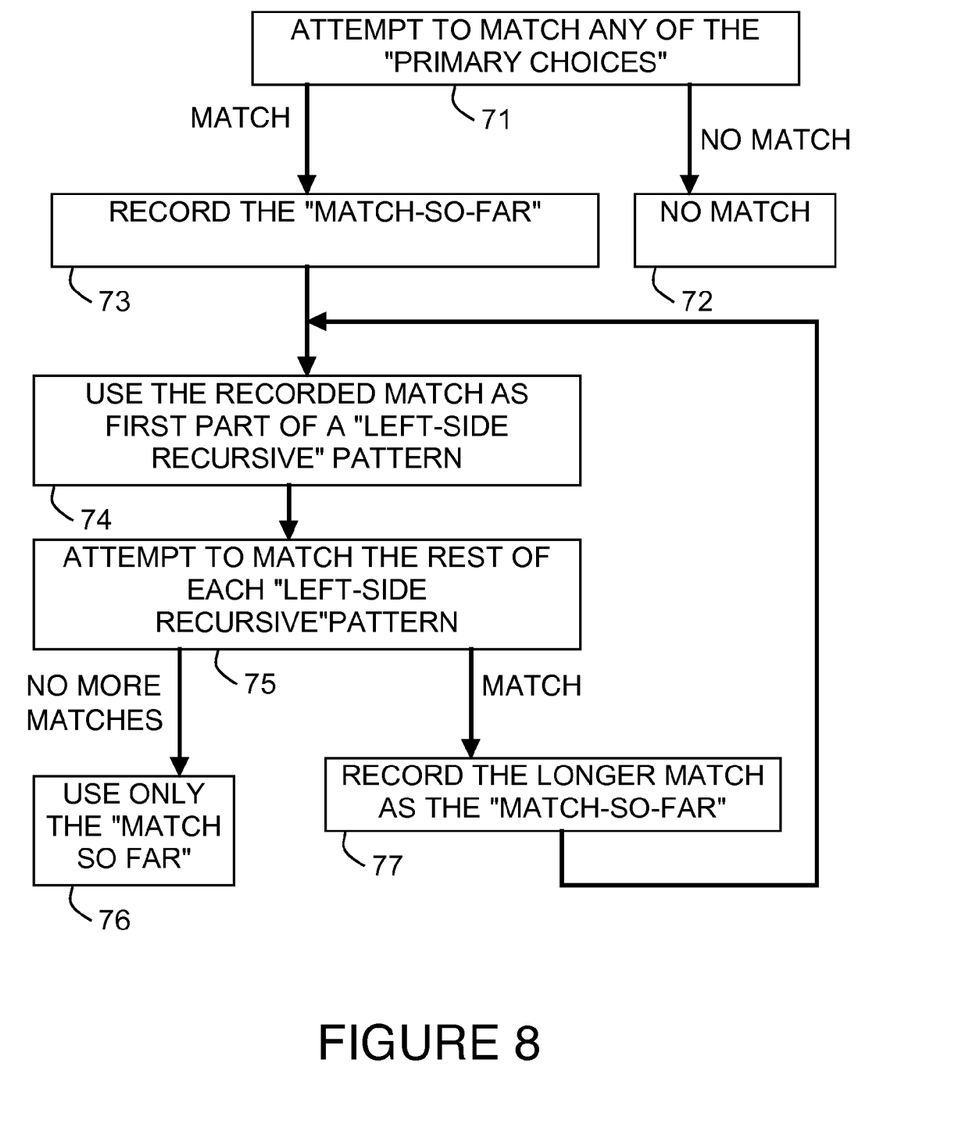
FIG. 8 shows logic flow for a precedence chooser in accordance with an embodiment.

FIG. 8 shows a shows logic flow for precedence chooser 106. The precedence chooser solves the problem of left side recursion, which must be solved to properly parse programming syntax involving operators, such as mathematical operators. The problem of left side recursion occurs because some patterns must expand on the left side of the operator. It is recursive, in that the same pattern is used for the expansion.

For example, in the mathematical statement "x-y-z", the correct order of operations can be described as "(x-y)-z" where the text inside the parenthesis is matched by the same pattern that matches the full statement. This creates a problem because the pattern must first be matched on the left-side of the operator, and then used again to match a longer pattern.

The "Precedence Chooser" is a solution to this problem. It is a class derived from Token Chooser which extends it to include two different lists of choices. One of these lists contains the "primary choices", which do not involve left-side-recursion, and the other list of choices holds those patterns that do.

In a block 71, an attempt is made to match any of the primary choices. If there is not a match, in a block 72, precedence chooser 106 returns with an indication of no match.

If in block 71, there is a match, in a block 73 the match so far is recorded. In a block 74, the recorded match is used as the first part of a left-side recursive pattern. In a block 75, an attempt is made to match the rest of the left side recursive pattern. When there are no more matches, in a block 76, precedence chooser 106 returns with the match so far. If in a block 75 there is a match, in a block 77 the longer match is recorded as the match so far and control is returned to block 74.

Table 8 presents an example of the member fields and data types of object-oriented classes setting out precedence rules for a Delphi program, where Delphi_Multiplicative_Expression has already been declared to have a higher precedence than Delphi_Additive_Expression.

TABLE 8

```
public class Delphi_Additive_Expression extends TokenSequence {
    public Delphi_Expression addend1 = new Delphi_Expression(
        AllowedPrecedence.ATLEAST, Delphi_Additive_Expression.class);
    public Delphi_Additive_Operator addOp;
    public Delphi_Expression addend2 = new Delphi_Expression(
        AllowedPrecedence.HIGHER, Delphi_Additive_Expression.class);
}
public class Delphi_Additive_Operator extends TokenChooser {
    public Delphi_Punctuation plus = new Delphi_Punctuation('+');
    public Delphi_Punctuation minus = new Delphi_Punctuation('-');
    public Delphi_Keyword OR = new Delphi_Keyword("Or");
    public Delphi_Keyword XOR = new Delphi_Keyword("Xor");
}
public class Delphi_Multiplicative_Expression extends TokenSequence {
    public Delphi_Expression factor1 = new Delphi_Expression(
        AllowedPrecedence.ATLEAST, Delphi_Multiplicative_Expression.
        class);
    public Delphi_Multiplicative_Operator multOp;
    public Delphi_Expression factor2 = new Delphi_Expression(
        AllowedPrecedence.HIGHER, Delphi_Multiplicative_Expression.
        class);
}
public class Delphi_Multiplicative_Operator extends TokenChooser {
    public Delphi_Punctuation times = new Delphi_Punctuation('*');
    public Delphi_Punctuation divide = new Delphi_Punctuation('/');
    public Delphi_Keyword DIV = new Delphi_Keyword("Div");
    public Delphi_Keyword MOD = new Delphi_Keyword("Mod");
    public Delphi_Keyword AND = new Delphi_Keyword("And");
}
```

With the Precedence Chooser, it is much easier to write the grammatical rules for expressions, and the resulting PST is very compact, without unnecessary intermediate levels.

Figure 9:
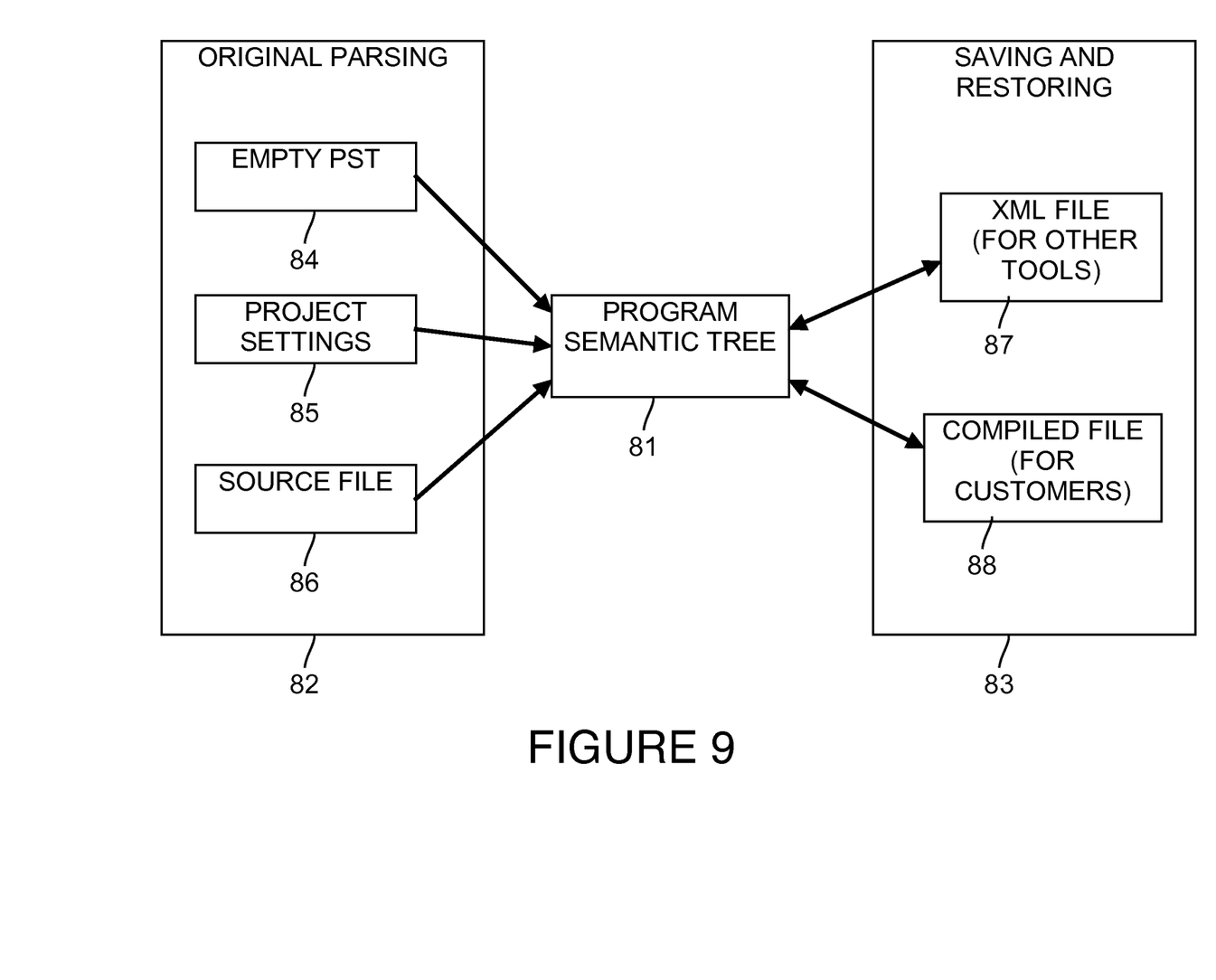
FIG. 9 illustrates creating, saving and restoring program semantic trees in accordance with another embodiment.

FIG. 9 is a flow diagram that that illustrates a typical parsing scenario. The flow goes from original parsing 82 to program semantic tree 81 to saving and restoring 83. A project settings file 85 contains information about where each source file is, how to decide what programming language it is in, and so on. One source file 86 at a time is parsed, generating a program semantic tree 81 from source file 86, project settings 85 and empty program semantic tree 84. Program semantic tree 81 can be saved, for example, to an XML file 87, or compiled into a file 88 containing a program, written in a programming language such as Java.

Reporting programs read program semantic trees 81 to determine overall parsing progress.

The PST can also be manipulated by other analysis tools. Many analysis steps such as inter-module dependencies can't complete until all the source files have been parsed.

When starting the parsing process, source files can be pre-edited, for example, to remove errors from source files. Source files arrive with errors, for example, because source files may be obsolete, may be rarely used, may be in the middle of updates, or any of a host of other reasons.

The pre-editing is performed on the in-memory version of the source file allowing the original version of source files to be left intact for the entire parsing process.

Occasionally there are unparsable elements. This can result because grammars and programs are rarely perfect. Both evolve over time. It is often useful to defer difficult parsing issues, or to skip over particularly difficult lines of source code. The program semantic tree provides a special unparsed token 108 for this purpose. It is processed identically to token sequence 102 except it is reported separately. It will collect all characters until parsing can recover and resume. Typically this will be until the end of the line, or until a special character like a semicolon (;) is reached. Parsing can still be considered successful, as long as the rest of the source file has been parsed so that a program semantic tree (PST) is complete. After parsing is complete, a report can be generated that indicates the unparsed elements in source code. The report can include the troublesome snippets of code that were not parsed.

A PST in a format such as that shown in Table 3 can be used to generate a traditional grammar in a format such as that shown in Table 2, to interface with other program analysis tools. None of the semantic information in a PST can be stored in a traditional grammar, which only contains syntactic information.

When modernizing a legacy application, it is important to know how frequently each of the language elements are used. Those that are used frequently should be transformed using automation, while those with just a few instances are candidates for manual transformation. Given particular project settings, such as that stored in project settings file 85, a report can be generated that shows frequency counts for all elements in an empty program semantic tree, such as empty program semantic tree 84.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A computer implemented parsing method, comprising:
    representing a grammar of a first programming language in member fields and data types of object-oriented classes of a second programming language as an empty program semantic tree; and,
    building a new program semantic tree that represents source code written in the first programming language, the new program semantic tree being built by a reflection technique in which the member fields and data types of the object-oriented classes of the second programming language as set out in the empty program semantic tree are modified during the building of the new program semantic tree, wherein building the new program semantic tree includes utilizing one or more of:
        a top level parsing routine to call token specific parsers,
        a parser to handle tokens in a token sequence, and/or
        a precedence chooser parser to parse programming syntax involving mathematical operators.

2. A computer implemented parsing method as in claim 1 wherein building the new program semantic tree includes:
    converting the source code into abstract tokens, the abstract tokens including:
    token sequences;
    token choosers;
    precedence tokens;
    unparsed tokens;
    token lists; and
    terminal tokens.

3. A computer implemented parsing method as in claim 1 wherein the token sequence parser calls a token list parser when there is a token list.

4. A computer implemented parsing method as in claim 3 wherein the token list parser recursively calls the top level parser for each token in the token list.

5. A computing device comprising:
    hardware for running computer programs;
    memory, for storing computer programs and data;
    a grammar of a first programming language represented in member fields and data types of object-oriented classes of a second programming language as an empty program semantic tree, the grammar being stored in the memory; and,
    a parser, run on the hardware, that builds a new program semantic tree that represents source code written in the first programming language, the new program semantic tree being built by a reflection technique in which the member fields and data types of the object-oriented classes of the second programming language as set out in the empty program semantic tree are modified during the building of the new program semantic tree, wherein the parser includes one or more of:
        a top level parsing routine to call token specific parsers,
        a parser to handle tokens in a token sequence, and/or
        a precedence chooser parser to parse programming syntax involving mathematical operators.

6. A computing device as in claim 5 wherein the parsing program converts the source code into abstract tokens, the abstract tokens including:
    token sequences;
    token choosers;
    precedence tokens;
    unparsed tokens;
    token lists; and
    terminal tokens.

7. A computing device as in claim 5 wherein the token specific parsers include a token list parser called by the token sequence parser calls when there is a token list.

8. A computing device as in claim 7 wherein the token list parser recursively calls the top level parser for each token in the token list.

9. Non-transient storage media that stores software which when run on a computer performs a computer implemented parsing method, comprising:
    representing a grammar of a first programming language in member fields and data types of object-oriented classes of a second programming language as an empty program semantic tree; and, building a new program semantic tree that represents source code written in the first programming language, the new program semantic tree being built by a reflection technique in which the member fields and data types of the object-oriented classes of the second programming language as set out in the empty program semantic tree are modified during the building of the new program semantic tree, wherein building the new program semantic tree includes utilizing one or more of:

a top level parsing routine to call token specific parsers, a parser to handle tokens in a token sequence, and/or a precedence chooser parser to parse programming syntax involving mathematical operators.

10. Non-transient storage media stores software as in claim 9 wherein building the new program semantic tree includes:

converting the source code into abstract tokens, the abstract tokens including:

token sequences;

token choosers;

precedence tokens;

unparsed tokens;

token lists; and terminal tokens.

11. Non-transient storage media stores software as in claim 9 wherein the token sequence parser calls a token list parser when there is a token list.

12. Non-transient storage media stores software as in claim 11 wherein the token list parser recursively calls the top level parser for each token in the token list.

\* \* \* \* \*